US010912962B2

(12) United States Patent
Katznelson et al.

(10) Patent No.: US 10,912,962 B2
(45) Date of Patent: Feb. 9, 2021

(54) PORTABLE ANCHORING APPARATUS FOR BUILDINGS

(71) Applicant: HIGHNOVATE, Kiryat Tivon (IL)

(72) Inventors: Beeri Berl Katznelson, Kiryat Tivon (IL); Idan Peretz, Shoham (IL); Eyal Mastboim, Ra'anana (IL)

(73) Assignee: HIGHNOVATE, Kiryat Tivon (IL)

( * ) Notice: Subject to any disclaimer, the term of this patent is extended or adjusted under 35 U.S.C. 154(b) by 0 days.

(21) Appl. No.: 16/476,877

(22) PCT Filed: Jan. 11, 2018

(86) PCT No.: PCT/IL2018/050047
§ 371 (c)(1),
(2) Date: Jul. 10, 2019

(87) PCT Pub. No.: WO2018/131040
PCT Pub. Date: Jul. 19, 2018

(65) Prior Publication Data
US 2019/0329078 A1 Oct. 31, 2019

(30) Foreign Application Priority Data
Jan. 11, 2017 (IL) ........................................ 250066

(51) Int. Cl.
*F16M 11/00* (2006.01)
*A62B 35/00* (2006.01)

(52) U.S. Cl.
CPC ................................ *A62B 35/0068* (2013.01)

(58) Field of Classification Search
CPC ............ A62B 35/0068; A62B 35/0056; E04G 21/3276
See application file for complete search history.

(56) References Cited

U.S. PATENT DOCUMENTS 2,568,233 A * 9/1951 Hamilton ................ B25B 5/003 269/43
3,880,255 A 4/1975 Huntley
(Continued)

FOREIGN PATENT DOCUMENTS

CA 2652671 8/2010
CN 102031927 A 4/2011
(Continued)

OTHER PUBLICATIONS

International Search Report of Application No. PCT/IL2018/050047 dated May 13, 2018.
(Continued)

*Primary Examiner* — Amy J. Sterling
(74) *Attorney, Agent, or Firm* — Pearl Cohen Zedek Latzer Baratz LLP

(57) ABSTRACT

A portable anchoring apparatus that includes a first connecting arm having a connecting hole, a second connecting arm, a first anchoring arm and a second anchoring arm. The first connecting arm and the second connecting arm are connected in overlap and parallel one to the other by a ratchet mechanism that includes an opening ratchet button. The first connecting arm and the first anchoring arm are connected to each other by an axial connector that has an opening button. The second connecting arm and the second anchoring arm are connected to each other by an axial connector that has an opening button.

13 Claims, 9 Drawing Sheets

(56) References Cited

U.S. PATENT DOCUMENTS

| | | | | |
|---|---|---|---|---|
| 4,047,353 | A | 9/1977 | Aarons | |
| 4,640,388 | A | 2/1987 | Walborn | |
| 4,671,384 | A | 6/1987 | Sing | |
| 5,730,407 | A | 3/1998 | Ostrobord | |
| 6,092,623 | A * | 7/2000 | Collavino | A62B 35/0056 182/3 |
| 7,111,707 | B2 * | 9/2006 | Reeves | E04G 21/3276 182/36 |
| 8,646,575 | B1 * | 2/2014 | Guthrie | A62B 35/0068 182/3 |
| D866,298 | S * | 11/2019 | Kanter | D8/354 |
| 2003/0051944 | A1 | 3/2003 | Shea | |
| 2014/0339016 | A1 | 11/2014 | Hopkins et al. | |

FOREIGN PATENT DOCUMENTS

| | | |
|---|---|---|
| EP | 1117884 | 7/2001 |
| EP | 1642621 | 4/2006 |
| JP | 3960913 | 8/2007 |

OTHER PUBLICATIONS

Office Action of Israeli Patent Application No. 250066, dated May 14, 2020.

* cited by examiner

PORTABLE ANCHORING APPARATUS FOR BUILDINGS

CROSS-REFERENCE TO RELATED APPLICATIONS

This application is a National Phase Application of PCT International Application No. PCT/IL2018/050047, International Filing Date Jan. 11, 2018, entitled "Portable Anchoring Apparatus for Buildings", published on Jul. 19, 2018 as International Patent Application Publication No. WO 2018/131040, claiming priority of Israel Patent Application No. 250066 filed on Jan. 11, 2017, all of which are incorporated herein by reference in their entirety.

TECHNICAL FIELD

The present invention refers to a portable anchoring apparatus.

BACKGROUND ART

Abseiling downward from a roof is used for performing work maintenance, doing extreme sports, and executing rescue and security missions. In these cases, the users should find an anchoring point on the roof to which to tie the abseiling rope. When there are no available anchoring points on the roof the user has to create one, using standard methods, which raise some difficulties to execute the mission done by security and rescue forces, mainly in emergency situations. The present patent application discloses a portable anchoring apparatus that provides an efficient solution to said problem and others.

SUMMARY OF THE INVENTION

A portable anchoring apparatus is disclosed comprising a first connecting arm, a second connecting arm, a first anchoring arm and a second anchoring arm, wherein at least one of the connecting arms comprises a connecting means. According to some embodiments the first connecting arm and the second connecting arm are connected to each other by a ratchet mechanism which comprises an opening ratchet button. According to some embodiments the first connecting arm and the first anchoring arm are connected to each other by an axial connector comprising an opening button. According to some embodiments the second connecting arm and the second anchoring arm are connected to each other by an axial connector comprising an opening button.

A method for using a portable anchoring apparatus is disclosed comprising obtaining a portable anchoring apparatus, attaching the portable anchoring apparatus to a roof, wherein a first connecting arm is placed on top of the roof, placing a first anchoring arm along the wall starting from the top of the roof, wherein the axial connector is used to affix the first connecting arm and the first anchoring arm in a required angle, opening the second connecting arm to an extent that matches the width of the roof, using the axial connector between the second connecting arm and the second anchoring arm to affix the required angle between them and threading a rope through a connecting means and securing its end to assure that the rope will be stretched as necessary while abseiling.

In some embodiments the method further comprising the use of a rotated extension arm.

In some embodiments the method further comprising the use of a locking cam system.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
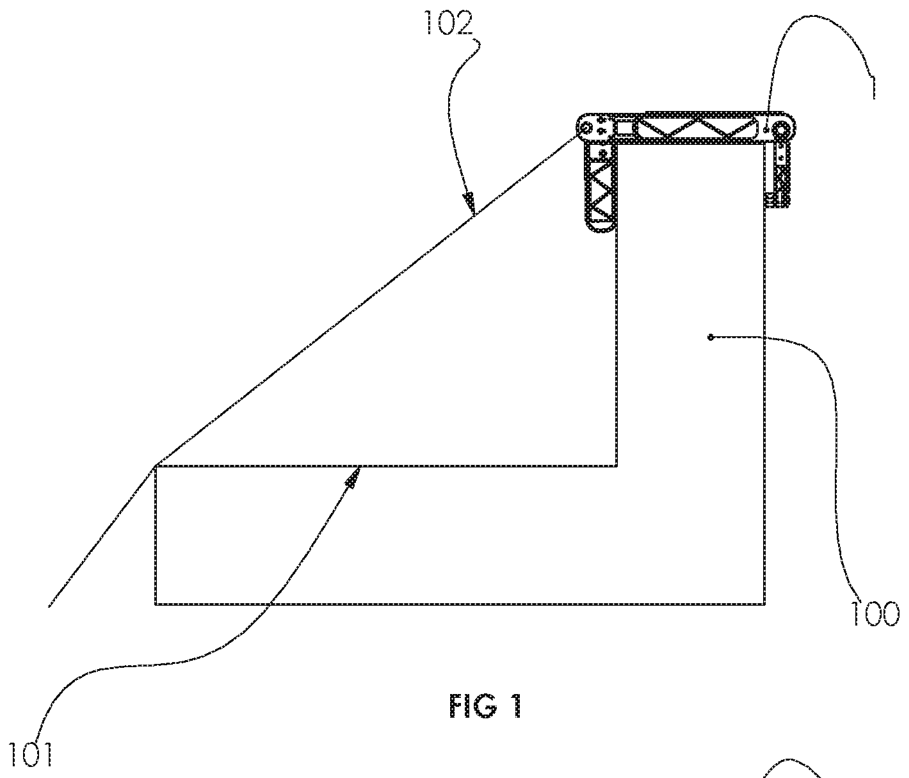
FIGS. 1 and 2 depict schematically the portable anchoring apparatus (1) affixed on edge (100) of a roof.

The main objective of the present invention is to provide a portable anchoring apparatus (1) which is designed to be easily and quickly affixed to an edge (100) of a roof (101) or many other kinds of objects.

The portable anchoring apparatus (1) subject matter of the present invention comprises a first connecting arm (2), a second connecting arm (3), a first anchoring arm (4) and a second anchoring arm (5). The first and the second connecting arms (2) and (3) are connected in a way allowing adjusting their combined length from end to end, for example overlap and parallel one to the other by a ratchet mechanism (231) in a way that enables each of said arms to move relatively along the other one to set the combined length of the two arms end-to-end. The connecting arms (2) and (3) can be in a "closed" position; means that they are overlapping one on the other almost along all of their length, or, in an "open" position; means that they are overlapping one on the other along small part of their length or not at all.

Figure 13:
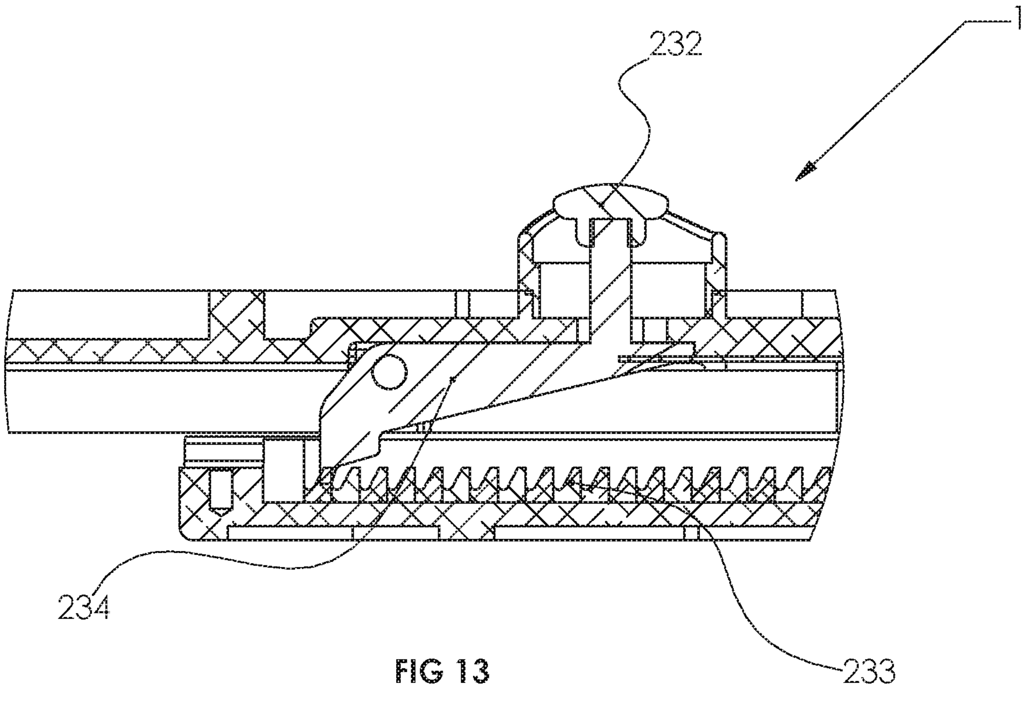
FIG. 13 depicts the linear rack with a line of teeth (233) and the running pawl (234).

The ratchet mechanism (231) includes an opening ratchet button (232) that enables the user to push on it and by that to enable the relative movement of said connecting arms (2) and (3). The ratchet mechanism (231) is designed in a way that for opening the connecting arms (2) and (3) the user should push on the opening ratchet button (232), and when the user wishes to close the connecting arms (2) and (3) he or she can do it by pushing on the side edges of these connecting arms, even without pushing on the opening ratchet button (232). The ratchet mechanism (231) may include a linear rack with a line of tooth (233) and a running pawl (234) which is controlled by the opening ratchet button (232), as depicts for example in FIG. 13.

However, closing these connecting arms (2) and (3) without using the opening ratchet button (323) will result with noise of the ratchet teeth and in case the user wishes to close these connecting arms without a noise he or she simply needs to push on the opening button (232) when closing these connecting arms. This structure is mainly needed for security forces when they prefer to act in silence. The structure of ratchet mechanism that functions in the above-mentioned manner is known to any average skilled person in the art and therefore it is needless to describe it in details.

The connection of the first connecting arm (2) with the first anchoring arm (4) is done by an axial connector (24), that has an opening button (241) and several teeth and pins, which enables these arms to be locked every few degrees. The user can push on the opening button (241) and then to change the opening angle between the first connecting arm (2) and the first anchoring arm (4) and to lock them in the required position. These arms can be locked in 180 degrees too. The structure of opening button (241) that functions in the abovementioned manner is known to any average skilled person in the art and therefore it is needless to describe it in details. The connection of the second connecting arm (3) with the second anchoring arm (5) is also done by an axial connector (35) that has an opening button (351), and they are function generally in the same way of the opening button 24.

The rotated extension arm (55): The second anchoring arm (5) may be equipped with a rotated extension arm (55) that has a longitudinal slot (551). The second anchoring arm (5) is connected with the longitudinal slot (551) by any axial connecting means (552) such as a pin or a screw. The rotated extension arm (55) can be locked relatively to the second anchoring arm (5) in a way that creates a 90 degrees angle between the second anchoring arm and the rotated extension arm (55), in a way that creates a 180 degrees angle between the second anchoring arm and the rotated extension arm (55), or in any angle in between, depending on the need. When the user prefers to prolong the second anchoring arm (5) then he can screw and lock the rotated extension arm (55) in a way that creates a 180 degrees angle between the second anchoring arm (5) and the rotated extension arm (55). Alternatively, when the user prefers to increase the width of the grasp of the second anchoring arm (5) he can lock the rotated extension arm (55) perpendicularly (with respect to the second anchoring arm).

Figure 3:
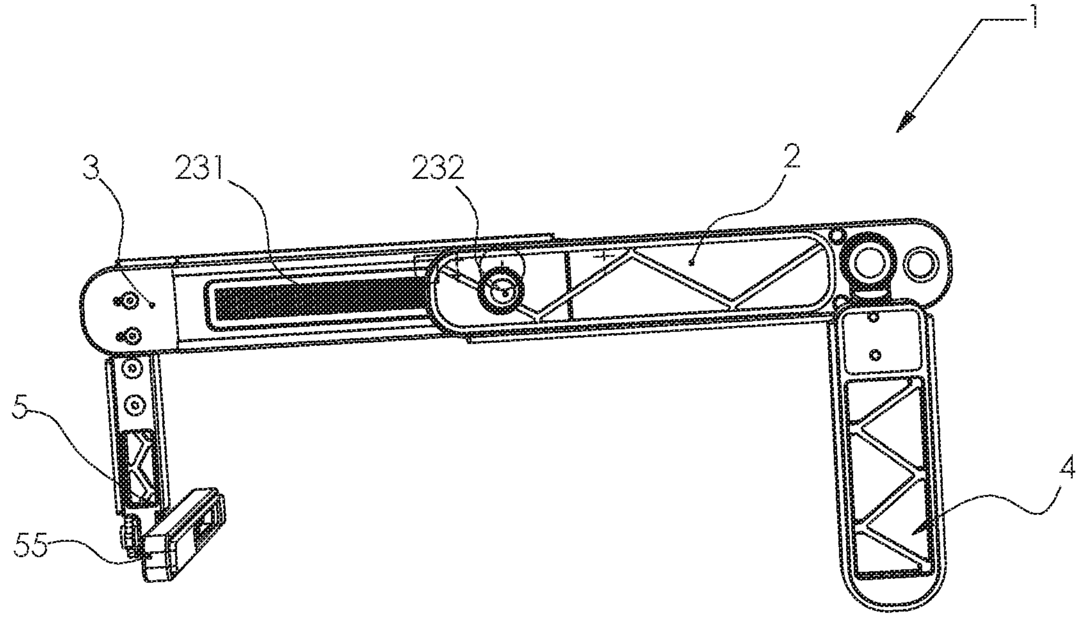
FIG. 3 is a front perspective view of the portable anchoring apparatus (1).
Figure 4:
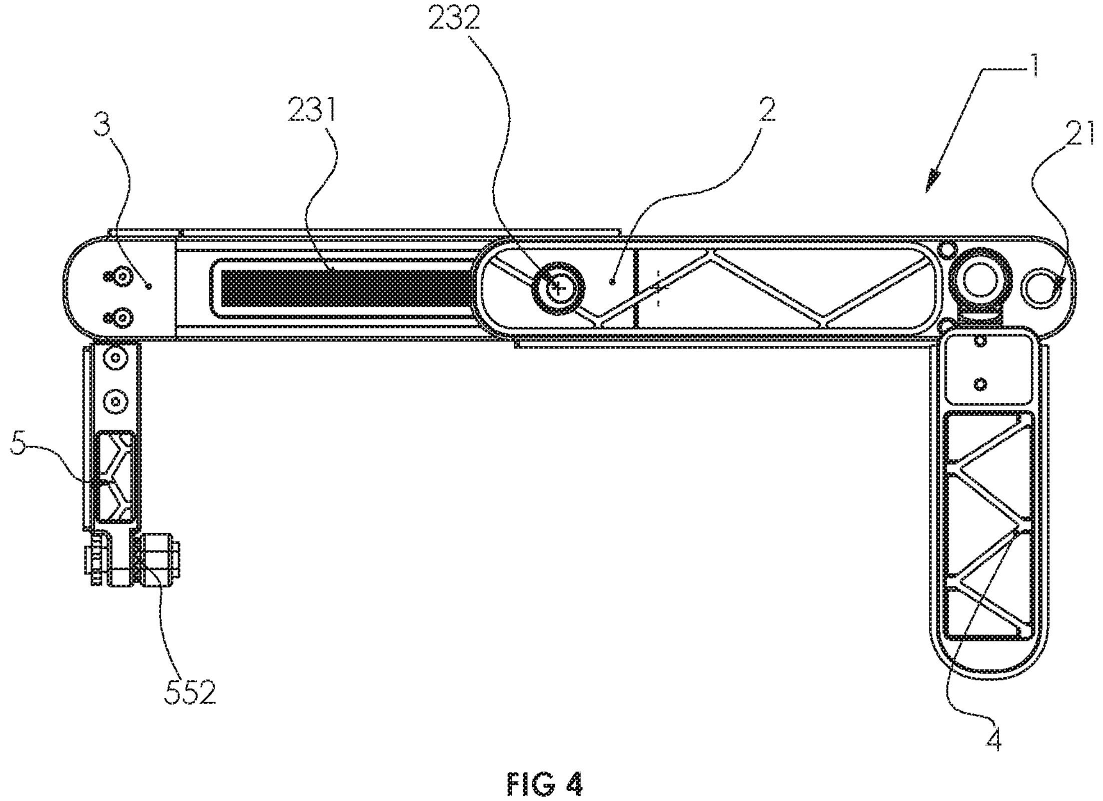
FIG. 4 is a side view of the portable anchoring apparatus (1).
Figure 5:
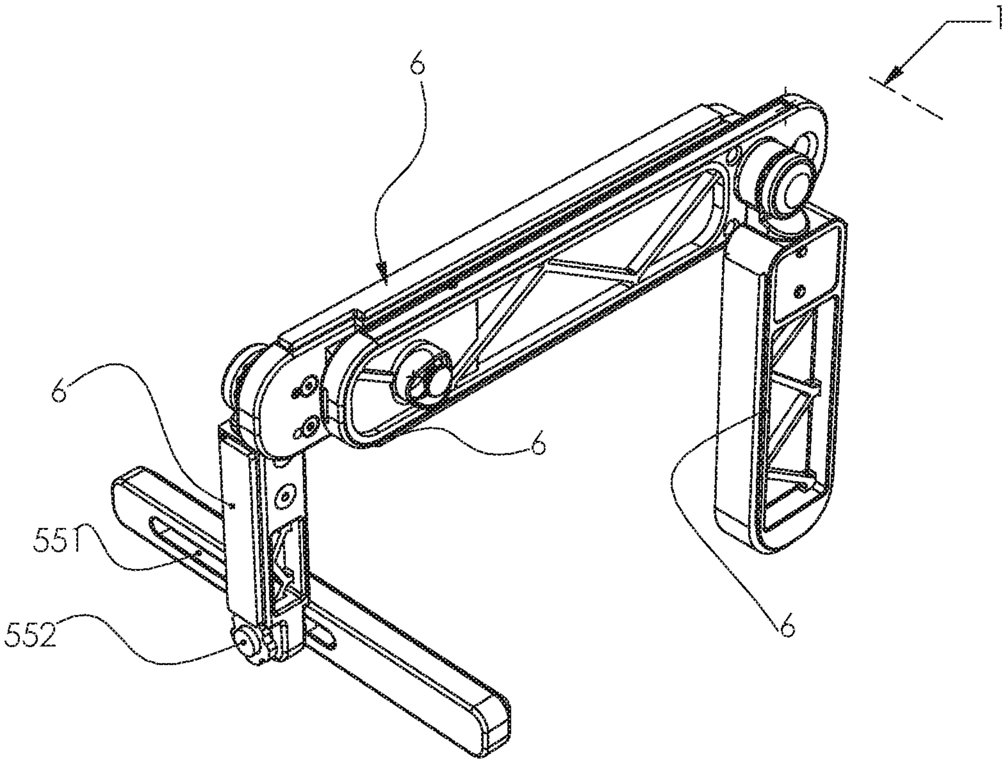
FIG. 5 is a back side perspective view of the portable anchoring apparatus (1).
Figure 6:
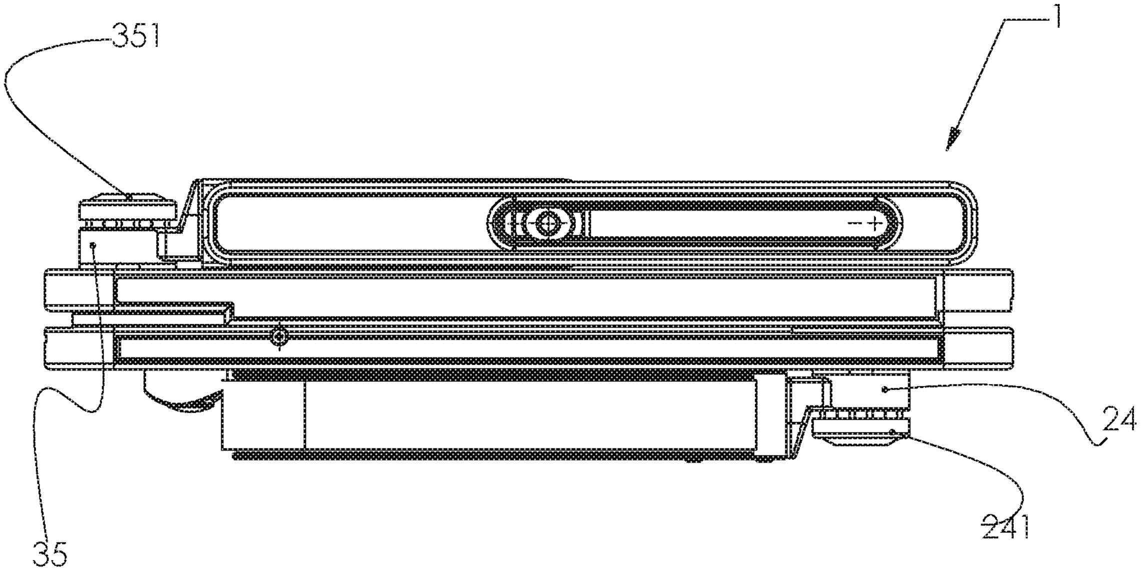
FIG. 6 is a top view of the portable anchoring apparatus (1) in a folded position.
Figure 7:
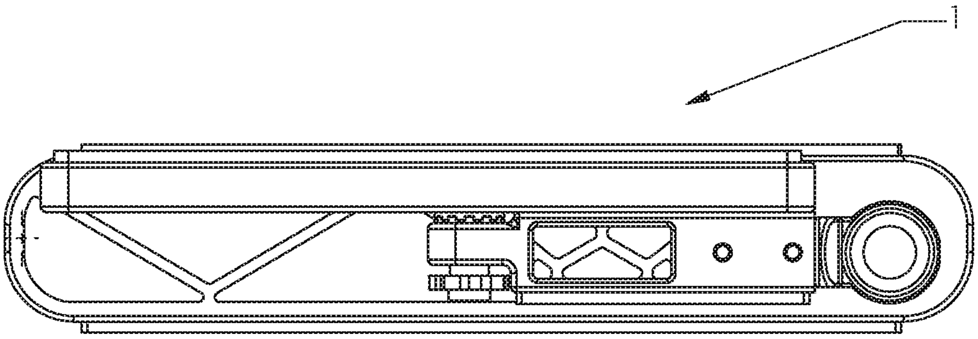
FIG. 7 is a side view of the portable anchoring apparatus (1) in a folded position.
Figure 8:
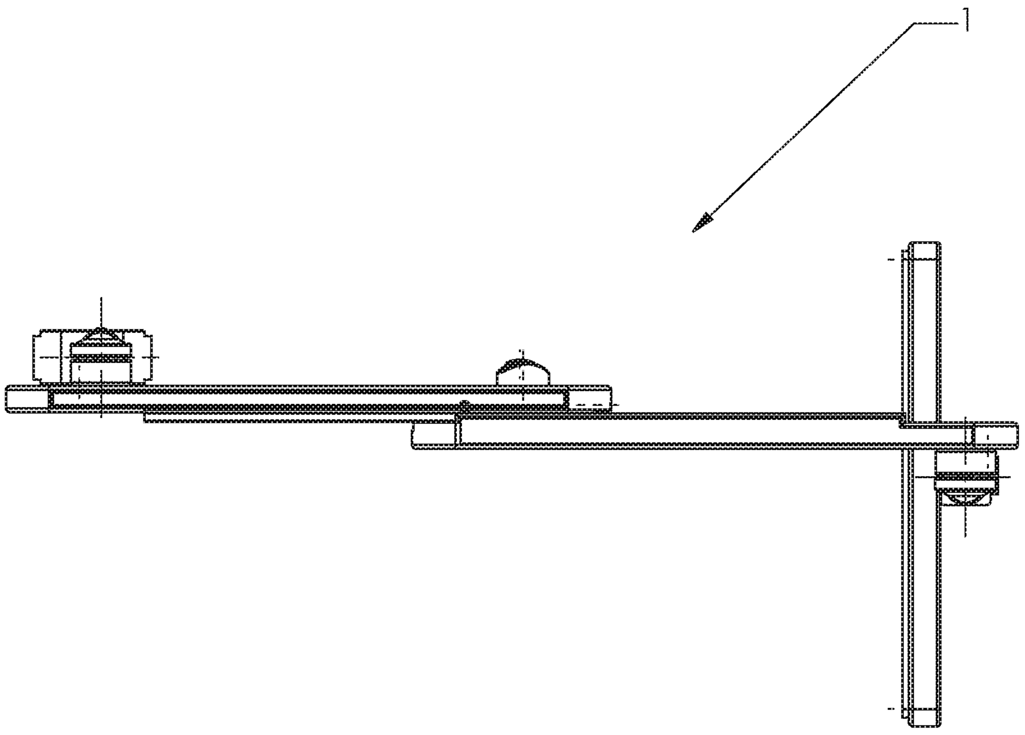
FIG. 8 is a top view of the portable anchoring apparatus (1).
Figure 9:
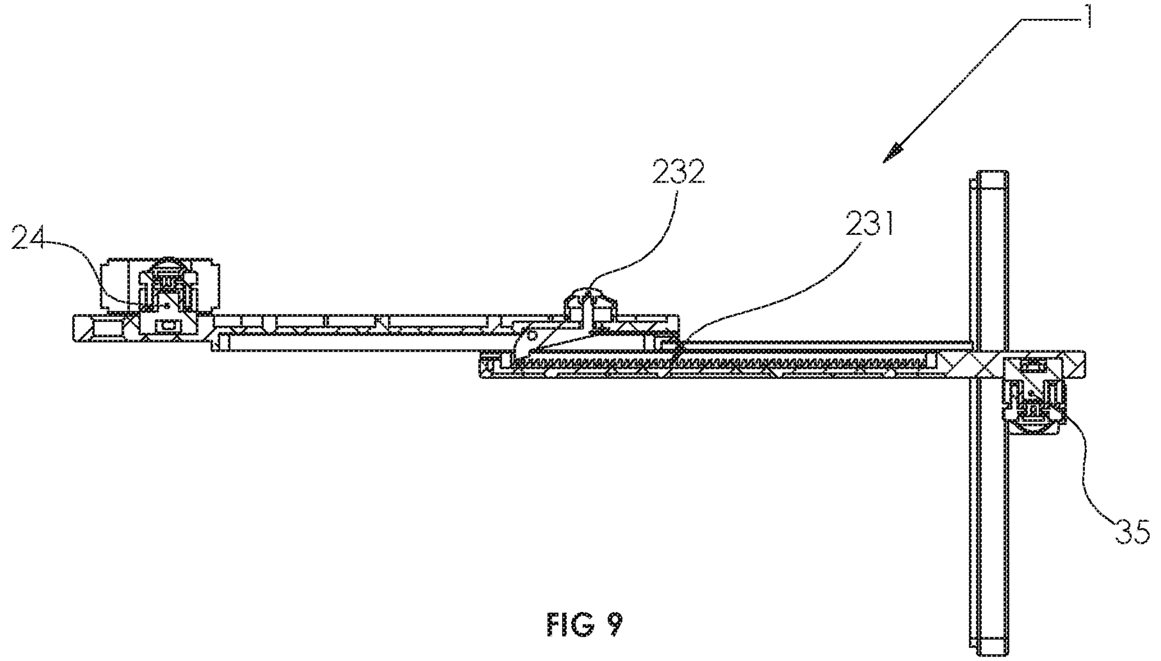
FIG. 9 is a top cross section view of the portable anchoring apparatus (1).
Figure 10:
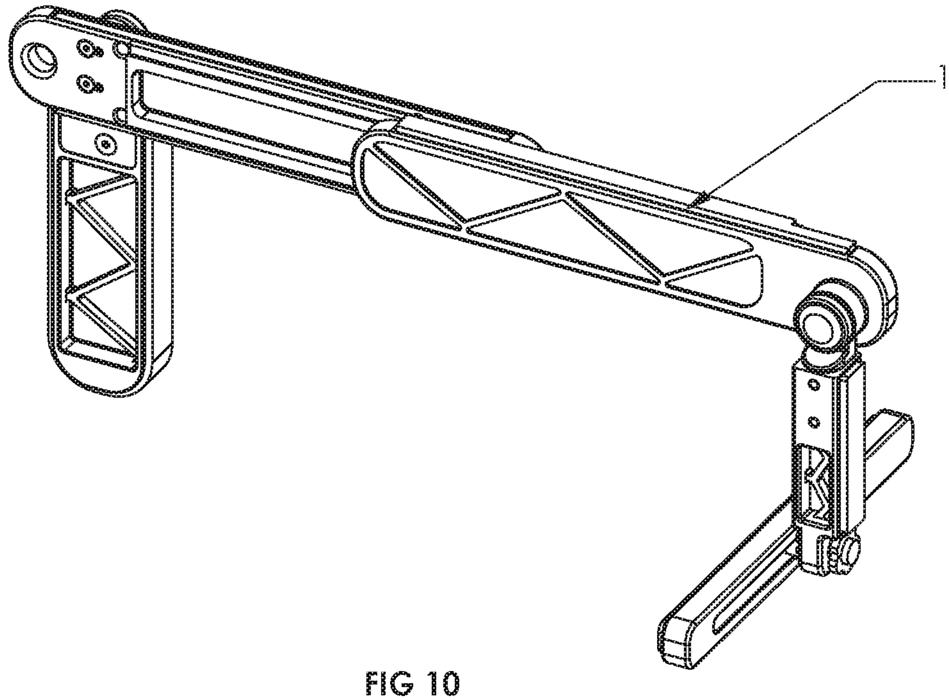
FIGS. 10-12 are perspective views of the portable anchoring apparatus (1).
Figure 11:
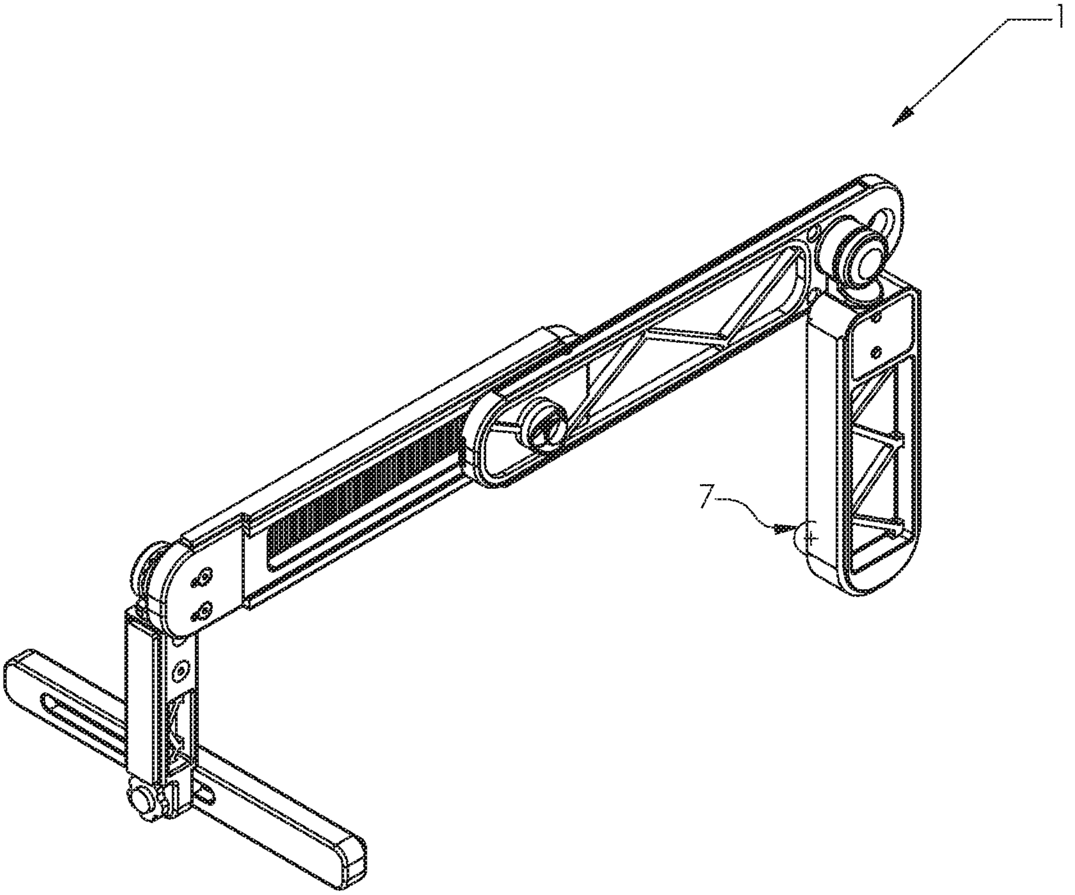
Figure 12:
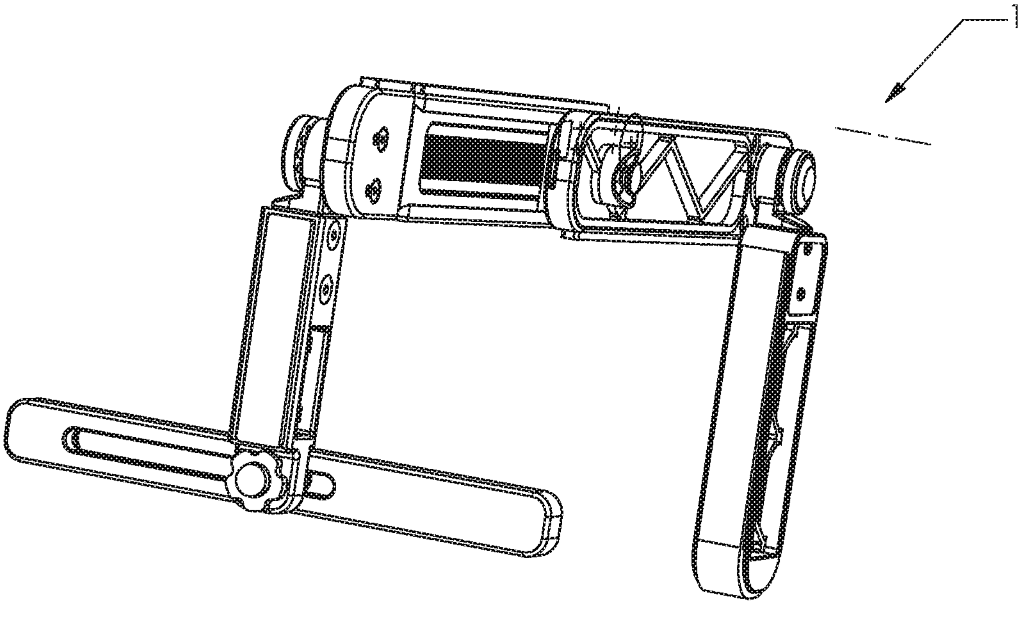

FIG. 3 is a front perspective view of the portable anchoring apparatus (1). FIG. 4 is a side view of the portable anchoring apparatus (1). FIG. 5 is a back side perspective view of the portable anchoring apparatus (1). FIG. 6 is a top view of the portable anchoring apparatus (1) in a folded position and FIG. 7 is a side view of the same. FIG. 8 is a top view of the portable anchoring apparatus (1). FIG. 9 is a top cross section view of the portable anchoring apparatus (1). FIGS. 10-12 are perspective views of the portable anchoring apparatus (1).

The portable anchoring apparatus (1) may also include a cam locking system (8) on the first anchoring arm (4), on the second anchoring arm (5) or on both of them. The cam locking system (8) includes a rounded cam (81), a pedal (82) and a lever (83). The rounded cam (81) is integrated perpendicularly (with respect to the angle between its axis and the relevant arm) in the first anchoring arm (4) and/or the second anchoring arm (5). The rounded cam (81) may comprise an eccentric hole (84) to which the pedal (82) is connected axially. The lever (83) is connected perpendicularly to the axis of the rounded cam (81) through an elongated slot (85). The lever (83) may be ended with a ball (831) to enable the user to move it easily and the elongated slot (85) may include a niche (851) to which the ball (831) is inserted when activating the cam locking system (8).

Figure 14:
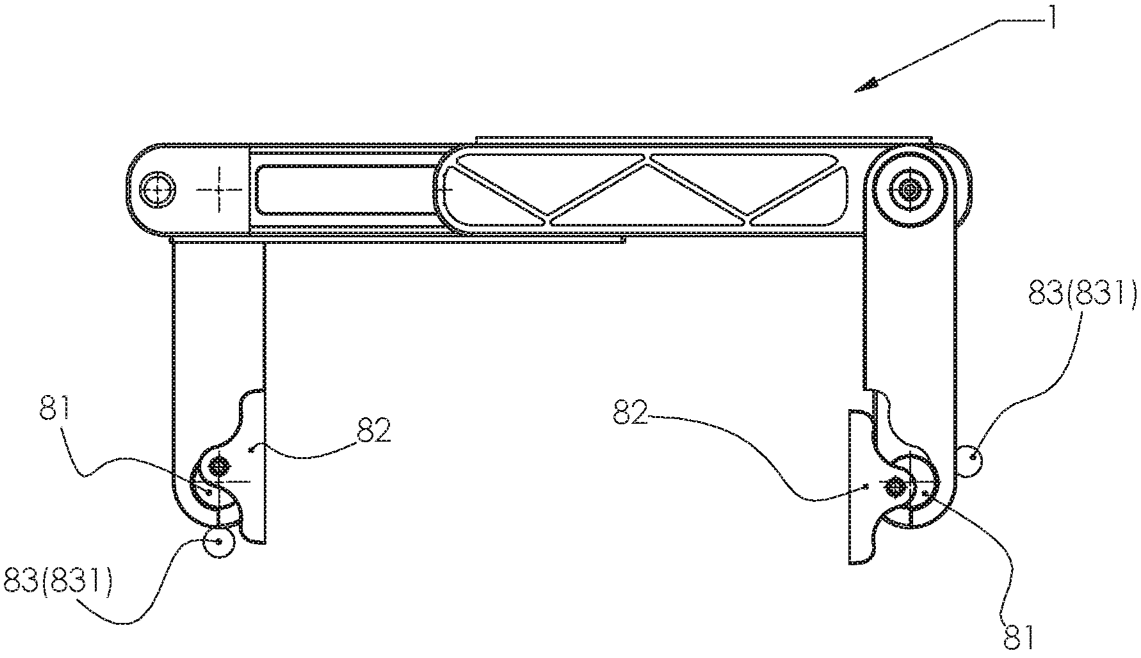
FIG. 14 depicts the side view of the portable anchoring apparatus (1) with the cam locking system (8).
Figure 15:
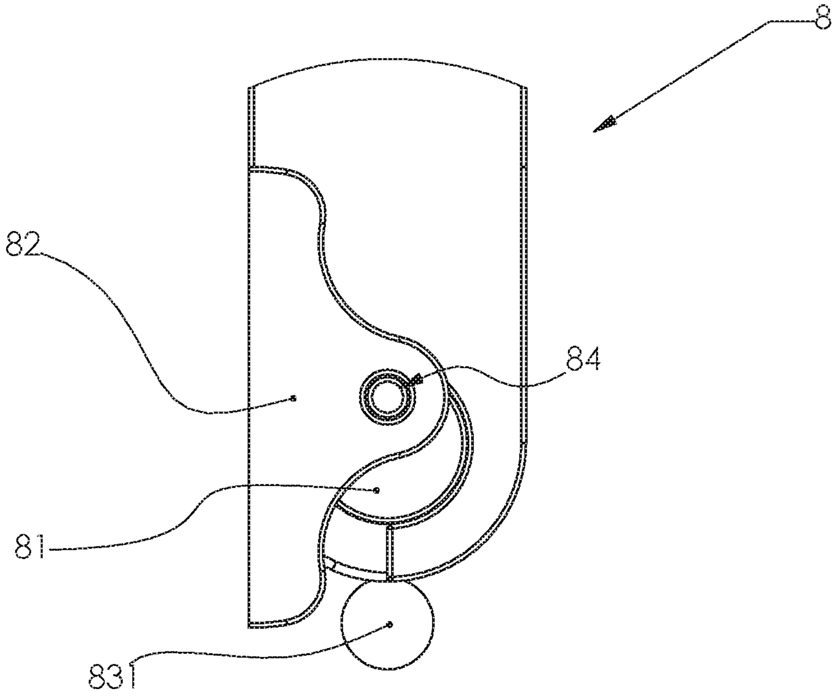
FIG. 15 depicts the side view of the cam locking system (8).
Figure 16:
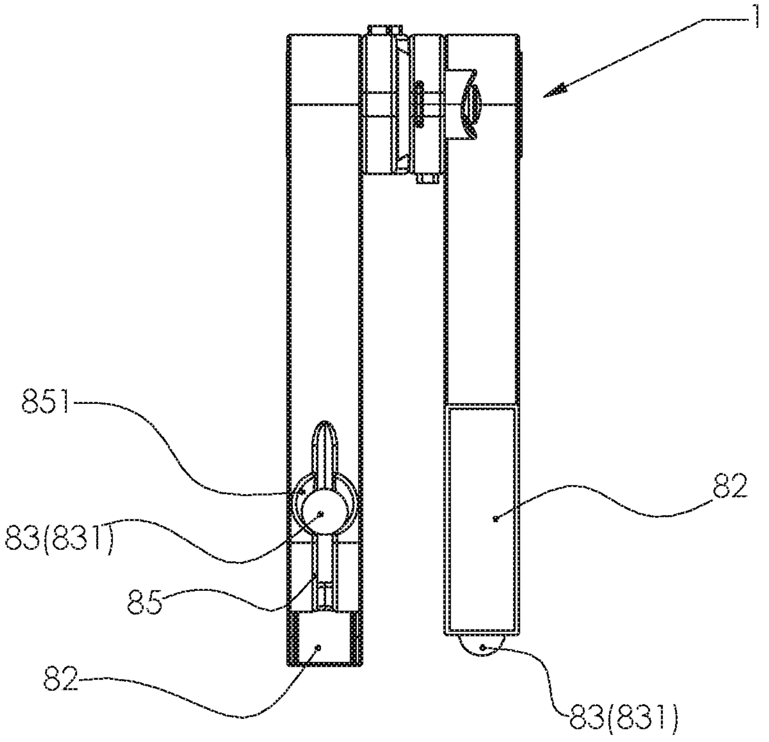
FIG. 16 depicts the portable anchoring apparatus (1) with the front and rear views of the cam locking system (8).
Figure 18:
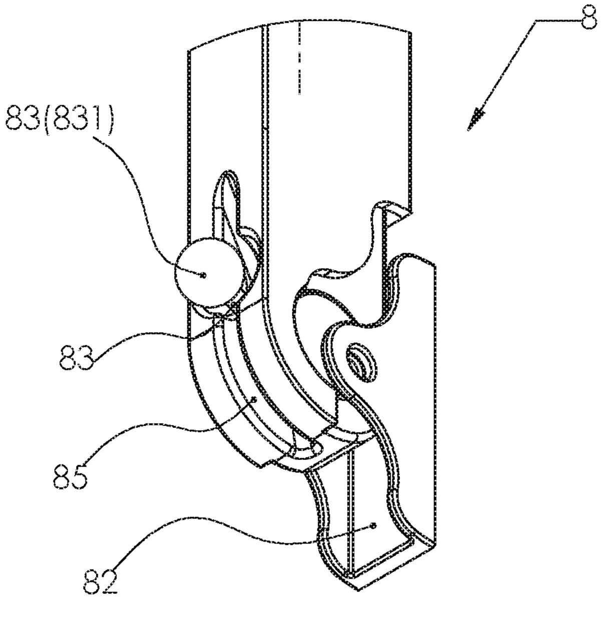
FIGS. 17 and 18 depict the cam locking system (8).
Figure 17:
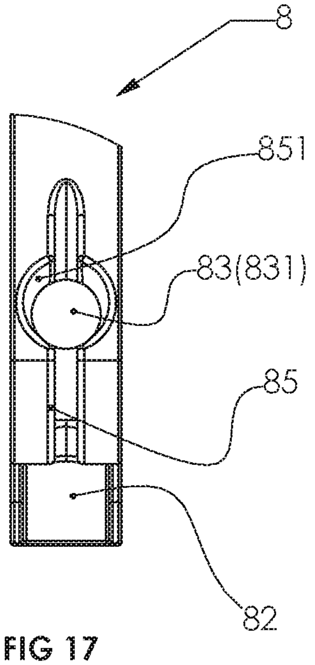

FIG. 14 depicts the side view of the portable anchoring apparatus (1) with the cam locking system (8) on the first anchoring arms 4 and the second anchoring arm 5. FIG. 15 depicts the side view of the cam locking system (8). FIG. 16 depicts the portable anchoring apparatus (1) with the front and rear views of the cam locking system (8) on the first anchoring arm 4 and the second anchoring arm 5. FIGS. 17 and 18 depict the cam locking system (8). After affixing the apparatus (1) to the object the user can operate the cam locking system (8) by moving the lever (83) and by that the pedal (82) protrudes and creates a better grasp of the apparatus (10) to the object to which it is affixed.

Figure 2:
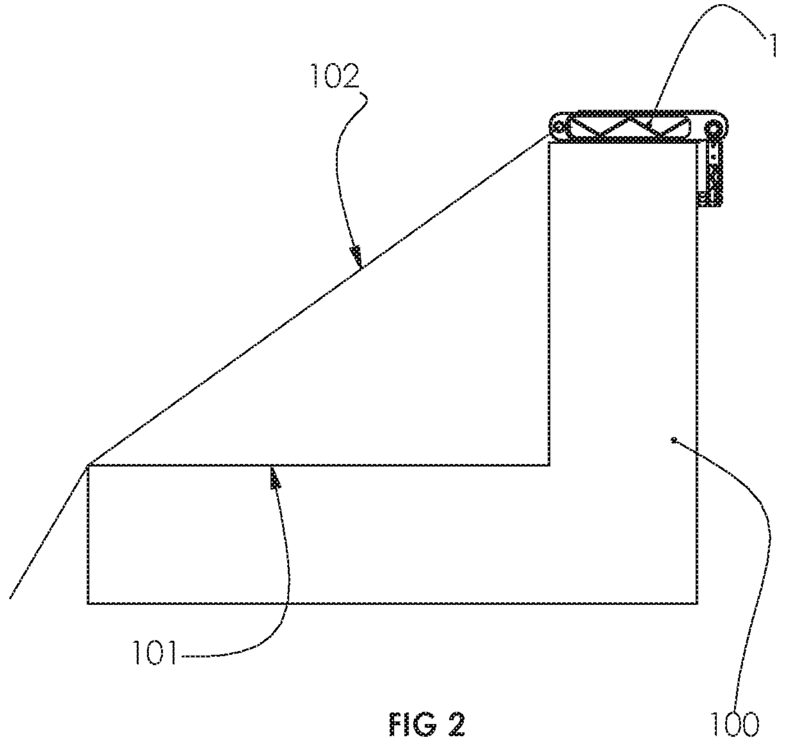

Using the portable anchoring apparatus (1): The user affixes the portable anchoring apparatus (1) on edge (100) of a roof (101). First, the user opens the connecting arms and closes them on the edge (100) as described schematically for example in FIG. 1. A rope (102) is tied to a connecting means (21) of the portable anchoring apparatus and said rope can be used safely for abseiling. FIG. 2 depicts schematically a situation when the edge of a roof is wide and the first anchoring arm (4) and the first connecting arm (2) are locked in a 90 degrees angle (with respect to each other). The connecting means (21) may be a hole as depicts in the drawings, a pin or any other suitable element and even the body itself of the portable anchoring apparatus (1).

The fact that the arms 2, 3, 4, 5 and 55 are connected with axial connections make it possible to fold the portable anchoring apparatus (1) as it is shown for example in FIGS. 6 and 7. In addition, this construction also enables to affix the portable anchoring apparatus (1) to objects with sloping walls and not only vertical walls (with respect to the ground of the Earth).

Rubber friction strips (6) and elastic rubber pieces (7): the sides of the arms 2, 3, 4, 5 and 55 that aimed to be in contact with the object to which the portable anchoring apparatus (1) is affixed may be coated by rubber friction strips (6) to increase the grasp of the portable anchoring apparatus (1) on that object. The inner sides of the first anchoring arm (4) and the second anchoring arm (5) may comprise elastic rubber pieces (7) to increase the grasp of the portable anchoring apparatus (1), especially when the wall of the object to which it is affixed is not smooth. The buttons (232), (241) and (351) are relatively big and whereby enables the user to operate the portable anchoring apparatus (1) also with gloves. The surface of the pedal of the cam locking system, which may contact a surface of a roof, may comprise a cover in order to improve the attaching of the portable anchoring apparatus (1) to that roof via a covered pedal.

What is claimed is:

1. A portable anchoring apparatus comprising:

a first connecting arm;

a second connecting arm;

a first anchoring arm;

a second anchoring arm;

a cam locking system comprising:

- a rounded cam;
- a pedal; and
- a lever;

wherein the rounded cam is integrated perpendicularly in the first anchoring arm and adapted to be axially connected to the pedal via an eccentric hole;

wherein the lever is connected perpendicularly to the rounded cam through an elongated slot comprising a niche;

wherein at least one of the connecting arms comprises a connecting means, wherein said first connecting arm and said second connecting arm are connected to each other by a ratchet mechanism which comprises an opening ratchet button; and wherein at least one of: said first connecting arm and said first anchoring arm and said second connecting arm and said second anchoring arm are connected to each other by an axial connector comprising an opening button.

2. The apparatus of claim 1 further comprising:

a second cam locking system comprising:

a rounded cam;

a pedal; and a lever;

wherein the rounded cam is integrated perpendicularly in the second anchoring arm and adapted to be axially connected to the pedal via an eccentric hole;

wherein the lever is connected perpendicularly to the rounded cam through an elongated slot comprising a niche.

3. The apparatus of claim 1 further comprising:

a rotatable extension arm comprising a longitudinal slot, wherein the second anchoring arm is connected to the rotated extension arm via an axial connecting means.

4. The apparatus of claim 1 further comprising:

a first connecting arm rubber friction strip;

a second connecting arm rubber friction strip;

a first anchoring arm rubber friction strip;

a second anchoring arm rubber friction strip;

a rotated extension arm rubber friction strip;

a first anchoring arm elastic rubber piece;

a second anchoring arm elastic rubber piece;

a first pedal cover; and a second pedal cover.

5. The apparatus of claim 1 further comprising a hole adjacent to the axial connector that connects the first connecting arm and the first anchoring arm as a connecting means.

6. A method for using a portable anchoring apparatus comprising:

attaching the portable anchoring apparatus to a roof, wherein a first connecting arm is placed on top of the roof;

placing a first anchoring arm along the wall starting from the top of the roof, wherein an axial connector is used to affix the first connecting arm and the first anchoring arm in a required angle;

opening a second connecting arm to an extent that matches the width of the roof;

using the axial connector between the second connecting arm and a second anchoring arm to affix the required angle between them;

operating a cam locking system comprising a rounded cam, a pedal and a lever, by moving the lever such that the pedal protrudes; and threading a rope through a connecting means and securing its end to assure that the rope is stretched as necessary while abseiling, wherein the rounded cam is integrated perpendicularly in the first anchoring arm and adapted to be axially connected to the pedal via an eccentric hole; and wherein the lever is connected perpendicularly to the rounded cam through an elongated slot comprising a niche.

7. The method of claim 6 further comprising using of a rotated extension arm.

8. The method of claim 6 further comprising using of a locking cam system.

9. The apparatus of claim 1 wherein said lever comprises a ball.

10. The method of claim 6 wherein said lever comprises a ball.

11. The method of claim 6 further comprising operating a second cam locking system comprising a rounded cam, a pedal and a lever, by moving the lever such that the pedal protrudes, wherein the rounded cam is integrated perpendicularly in the second anchoring arm and adapted to be axially connected to the pedal via an eccentric hole, and wherein the lever is connected perpendicularly to the rounded cam through an elongated slot comprising a niche.

12. The method of claim 6 further comprising connecting the second anchoring arm to a rotatable extension arm comprising a longitudinal slot, via an axial connecting means.

13. The method of claim 6 further comprising connecting the first connecting arm and the first anchoring arm via a hole adjacent to the axial connector as a connecting means.

* * * * *